(12) United States Patent
Dagate et al.

(10) Patent No.: US 11,140,280 B2
(45) Date of Patent: Oct. 5, 2021

(54) SYSTEM AND METHOD FOR DELIVERING AN INBOUND FAX FROM A SERVER TO A USER AS EACH PAGE IS RECEIVED

(71) Applicant: FaxLogic, LLC, Dallas, TX (US)

(72) Inventors: Michael P. Dagate, Plano, TX (US); David G. Mahaffey, Plano, TX (US); Eric C. D. Lenington, Dallas, TX (US)

(73) Assignee: FAXLOGIC, LLC, Dallas, TX (US)

( * ) Notice: Subject to any disclaimer, the term of this patent is extended or adjusted under 35 U.S.C. 154(b) by 0 days.

(21) Appl. No.: 16/547,286

(22) Filed: Aug. 21, 2019

(65) Prior Publication Data

US 2021/0058522 A1    Feb. 25, 2021

(51) Int. Cl.
*H04N 1/00* (2006.01)
*H04N 1/32* (2006.01)

(52) U.S. Cl.
CPC ..... *H04N 1/00244* (2013.01); *H04N 1/00214* (2013.01); *H04N 1/32406* (2013.01); *H04N 2201/3287* (2013.01)

(58) Field of Classification Search
CPC ....... H04N 2201/3287; H04N 1/00244; H04N 1/00214
See application file for complete search history.

(56) References Cited

U.S. PATENT DOCUMENTS

| 5,270,830 | A | 12/1993 | Suzuki |
| 5,539,530 | A | 7/1996 | Reifman et al. |
| 5,644,405 | A | 7/1997 | Sato |
| 5,801,839 | A | 9/1998 | Ochiai |
| 6,115,141 | A | 9/2000 | Kim |
| 8,593,662 | B2 | 11/2013 | Shiono |
| 8,937,742 | B2 | 1/2015 | Okamoto |
| 9,204,003 | B2 | 12/2015 | Nishiyama et al. |
| 9,413,905 | B2 | 8/2016 | Utsumi |
| 2005/0200906 | A1* | 9/2005 | Tanimoto ........... H04N 1/00222 358/400 |
| 2005/0275871 | A1* | 12/2005 | Baird ................. H04L 12/2854 358/1.15 |
| 2005/0286090 | A1 | 12/2005 | Ahne et al. |
| 2009/0034015 | A1* | 2/2009 | Mulligan ........... H04N 1/00832 358/408 |
| 2011/0029624 | A1* | 2/2011 | Kosuda ................... H04L 51/14 709/206 |
| 2011/0228351 | A1* | 9/2011 | Uchida .............. H04N 1/00413 358/474 |

(Continued)

FOREIGN PATENT DOCUMENTS

WO    2000065822 A1    11/2000
WO      200457839 A2     7/2004

*Primary Examiner* — Nicholas Pachol

(57) ABSTRACT

A method for delivering a fax to a fax recipient includes receiving a multipage fax transmitted at a fax server. As each page of a multipage fax is received, a page event notification is generated. Each page of the multipage fax file is converted into a corresponding page file. A page complete notification is generated upon completion of conversion of each page of the multipage fax file into the page file. Access is enabled to the page file of the multipage fax file responsive to receipt of the page complete notification associated with the page file. Access to the page file is enabled while subsequent pages of the multipage fax are being received and converted to the associated fax file.

18 Claims, 6 Drawing Sheets

(56) References Cited

U.S. PATENT DOCUMENTS

| | | | |
|---|---|---|---|
| 2013/0229694 A1* | 9/2013 | Tonegawa | H04N 1/00095 358/426.01 |
| 2014/0204411 A1* | 7/2014 | Riedel | H04N 1/00228 358/1.15 |
| 2015/0146256 A1* | 5/2015 | Schwarz | H04N 1/00204 358/1.15 |
| 2016/0094732 A1 | 3/2016 | Nakamura | |
| 2016/0188215 A1* | 6/2016 | Ikeda | G06F 11/1004 |
| 2019/0098170 A1* | 3/2019 | Kodimer | H04N 1/00816 |

* cited by examiner

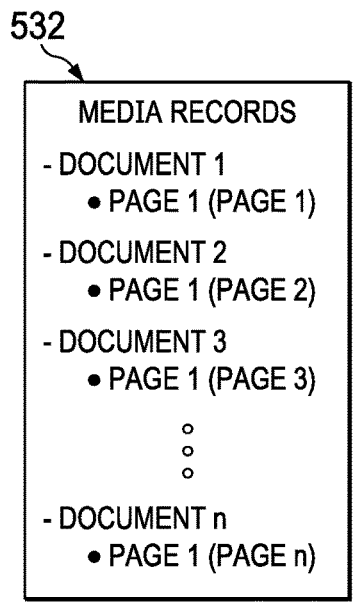
FIG. 9
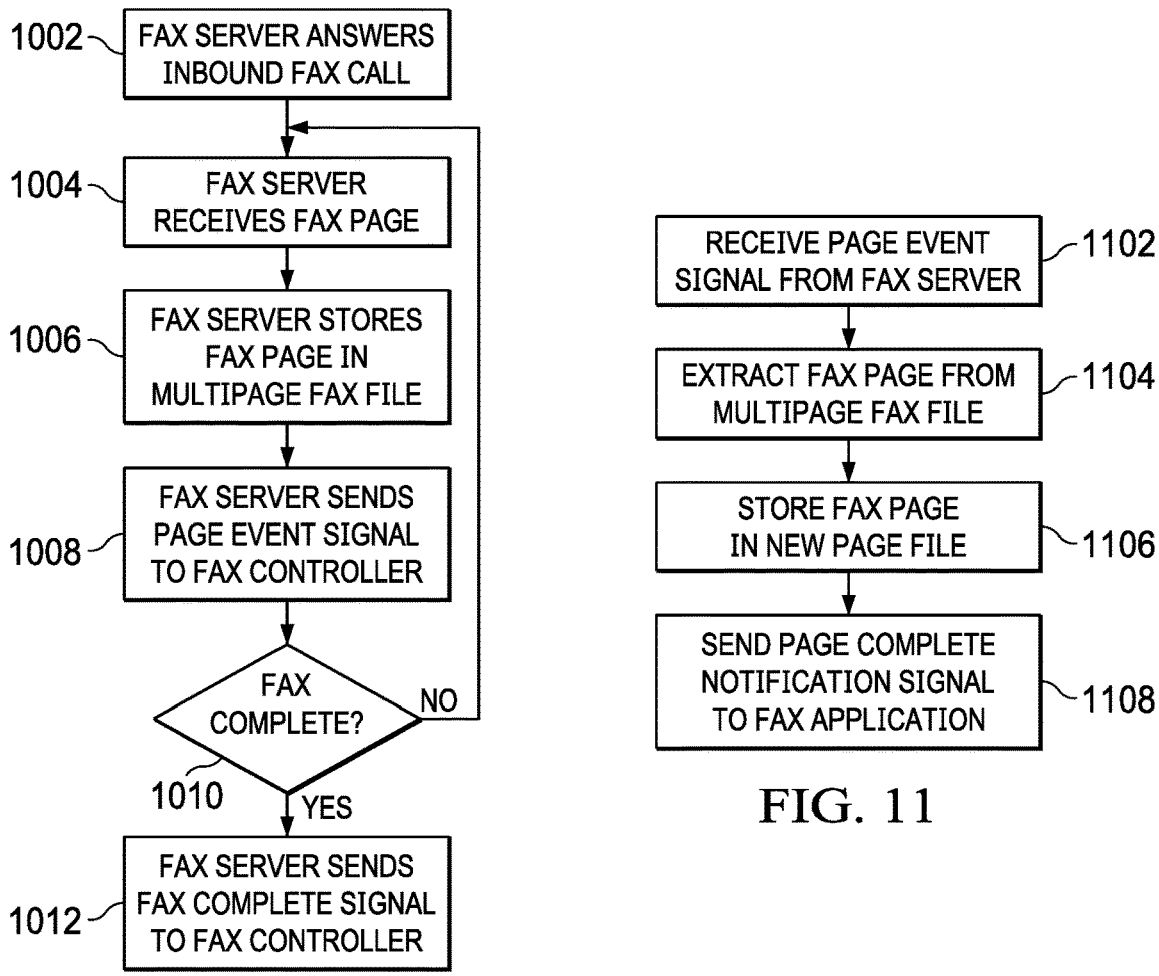
FIG. 10
FIG. 11

SYSTEM AND METHOD FOR DELIVERING AN INBOUND FAX FROM A SERVER TO A USER AS EACH PAGE IS RECEIVED

TECHNICAL FIELD

The present invention relates to fax transmissions, and more particularly, to providing access to fax transmissions at a fax recipient on a page by page basis for an inbound fax transmission from a server to a user.

BACKGROUND

Fax transmissions have long been a manner for providing the ability to transmit documents from one location to another. A fax transmission scans a document at a first location and transmits it from the transmitting location to a receiving location. The received document is reconstituted into a viewable format that may be accessed and reviewed by the fax recipient. Modern fax servers and services do not provide a fax recipient with access to the fax pages until the entire transmitted fax file has been received. In certain situations, this delay in the ability to view the fax can create losses of business opportunity. Thus, there has arisen a need for the ability to more quickly view the individual pages in a fax transmission than are available using current technologies.

SUMMARY

The present invention, as disclosed and described herein, in one aspect thereof, comprises a method for delivering a fax to a fax recipient and includes receiving a multipage fax transmitted at a fax server. As each page of a multipage fax is received, a page event notification is generated. Each page of the multipage fax is received in a multipage fax file and converted into a corresponding page file. A page complete notification is generated upon completion of conversion of each page of the multipage fax file into the corresponding page file. Access is enabled to the page file of the multipage fax file responsive to receipt of the page complete notification associated with the page file. Access to the page file is enabled while subsequent pages of the multipage fax are being received and converted to the associated fax file.

BRIEF DESCRIPTION OF THE DRAWINGS

For a more complete understanding, reference is now made to the following description taken in conjunction with the accompanying Drawings, in which:

FIG. 9 illustrates the media records stored for a received fax by the fax application;

FIG. 10 illustrates a flow diagram of the fax processing by the fax server under control of the fax controller;

FIG. 11 illustrates a flow diagram of the fax page processing by the fax controller;

DETAILED DESCRIPTION

Figure 1:
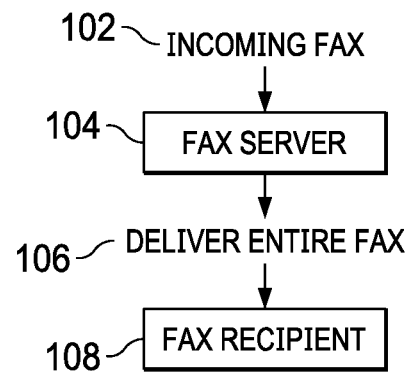
FIG. 1 illustrates a system for the delivery of a facsimile document to a fax recipient.

Referring now to the drawings, wherein like reference numbers are used herein to designate like elements throughout, the various views and embodiments of system and method for transmitting faxes to a receiver on a page by page basis are illustrated and described, and other possible embodiments are described. The figures are not necessarily drawn to scale, and in some instances, the drawings have been exaggerated and/or simplified in places for illustrative purposes only. One of ordinary skill in the art will appreciate the many possible applications and variations based on the following examples of possible embodiments.

Referring now to FIG. 1, there is generally illustrated the current technique for delivering an inbound facsimile (fax) to a recipient. An incoming fax 102 is received at a fax server 104. The fax server 104 may comprise hardware and/or software that is configured for the transmission of faxes from one location to another. The fax server 104 delivers the entire fax 106 from the fax server to the fax recipient 108. Since the entire fax 106 is delivered, the fax recipient 108 is unable to review individual pages of the delivered fax 106 until the entire fax has been received at the fax recipient 108. In many situations, this would not present a problem. However, certain situations may arise wherein the delivery of the fax 106 from the fax server 104 to the fax recipient 108 may need to be viewed in a timely fashion due to outside constraints.

Figure 2:
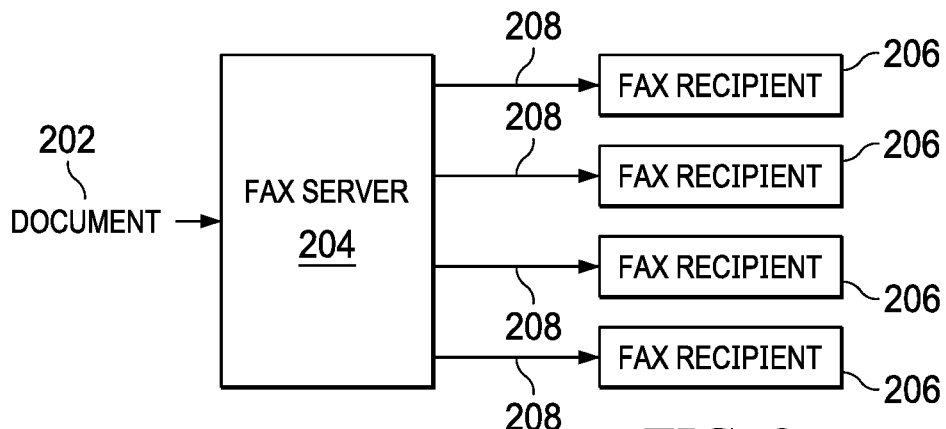
FIG. 2 illustrates the manner in which a fax may be transmitted to multiple fax recipients in multiple medical treatment environments.

Referring now to FIG. 2, there is illustrated an example of a scenario for sending a document 202 to multiple fax recipients 206 in a medical treatment situation. In a situation where a patient is being treated, for example, by an urgent care facility, and the urgent care facility is unable to provide a particular service to the patient, there is a need to transfer the patient to an outside facility. In order to carry out this process, the urgent care facility transmits faxes to multiple different healthcare providers that provide the necessary medical service. This is illustrated with the document 202 being provided to a fax server 204 associated with the urgent care facility. The fax server 204 transmits multiple outbound faxes 208 to different fax recipients 206. Each of the facsimile transmissions to the fax recipients contains the same information in the same number of pages. If each fax recipient 206 must wait until they have received the entire fax before they can view and respond to the material within the fax, a great deal of time is lost in transmitting the fax information to the fax recipient. Many times, the information transmitted to the differing healthcare providers providing the additional medical service includes an entire patient file comprising a large number of pages. However, the information required by the healthcare provider, in order to determine whether to take the patient from the urgent care facility, resides in the first few pages of the fax. Thus, requiring the healthcare provider to wait until the entire fax is received in order to view the first few pages of the document, enabling a decision to be made on whether to accept the patient, causes a great amount of delay. Thus, some manner for viewing the initial pages of a facsimile transmission, even while the remaining pages of the facsimile transmission are being received, would be greatly beneficial to a fax recipient who may need to make a decision quickly on whether or not to accept the patient. While the above description has been made with respect to the accepting of patients by healthcare providers from urgent care facilities, the system is applicable in any situation wherein facsimiles containing many pages are transmitted to a fax recipient and the fax recipient requires only the first few pages in order to make a decision based upon a fax transmission or where multiple fax recipients compete for business based upon fax transmissions.

Figure 3:
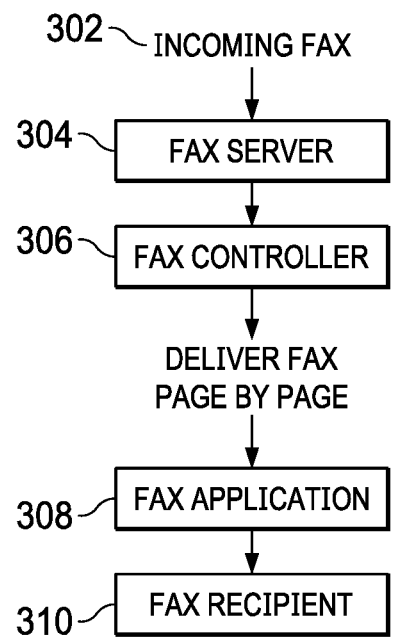
FIG. 3 illustrates a general block diagram of the improved method for the delivery of a facsimile document to a fax recipient, enabling individual page viewing by a fax recipient.
Figure 4:
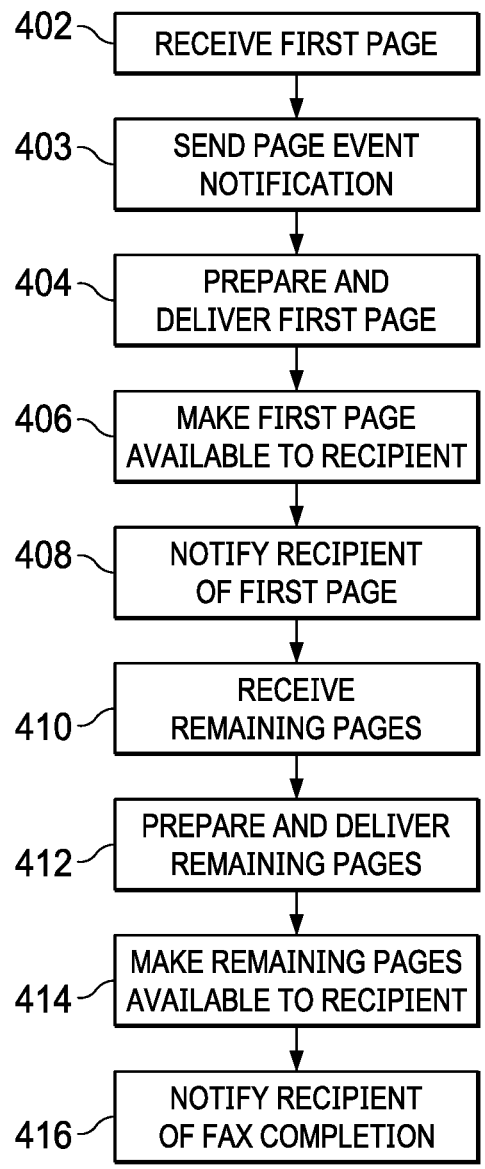
FIG. 4 illustrates a flow diagram of the method for the delivery of a facsimile document to a fax recipient, enabling individual page viewing by a fax recipient.

Referring now to FIGS. 3 and 4, there are illustrated a manner for addressing the issues referenced with respect to FIG. 2 using a system enabling a fax recipient to access individual pages of a fax before the entire fax transmission is completed. The incoming fax 302 is transmitted to a fax server 304 in a manner similar to that described hereinabove. However, the fax server 304 is under control of a fax controller 306 that controls the manner in which information is delivered from the fax server 304 to the fax recipient 310. In this case, the fax controller 306 sends multiple page files to the fax application 308, and each page file is associated with an individual page of the fax transmission. This is distinct from the previous manner of delivery by the fax server wherein a single fax file would include all of the pages of the facsimile transmission and an individual page could not be viewed until the entire facsimile transmission had been received. By delivering multiple page files from the fax server 304 to the fax application 308, the fax recipient 310 can view each individual page of the facsimile transmission as it is received rather than having to wait until the entire facsimile transmission has been received as a single fax file.

This process is more fully illustrated in the flow diagram of FIG. 4. The incoming facsimile transmission 302 is received by the fax server 304 at step 402. The fax server 304 notifies the fax controller 306 that a page has arrived at step 403. The fax controller 306 generates the first page file of the facsimile transmission and delivers the first page file to the fax application 308 at step 404. The fax application 308 makes the first page available to recipient 310 at step 406 and sends a notification at step 408 to the fax recipient 310 that notifies the recipient of delivery of the first page. Meanwhile, the remainder of the facsimile transmission is being received by the fax server 304. The page files associated with the remaining pages of the facsimile transmission are received at step 410 from the fax server 304 under control of the fax controller 306. The fax application 308 makes these additional pages available to the recipient 310 at step 412, as they are received. Finally, the fax application 308 notifies the recipient of completion of all pages of the fax transmission at step 416.

Figure 5:
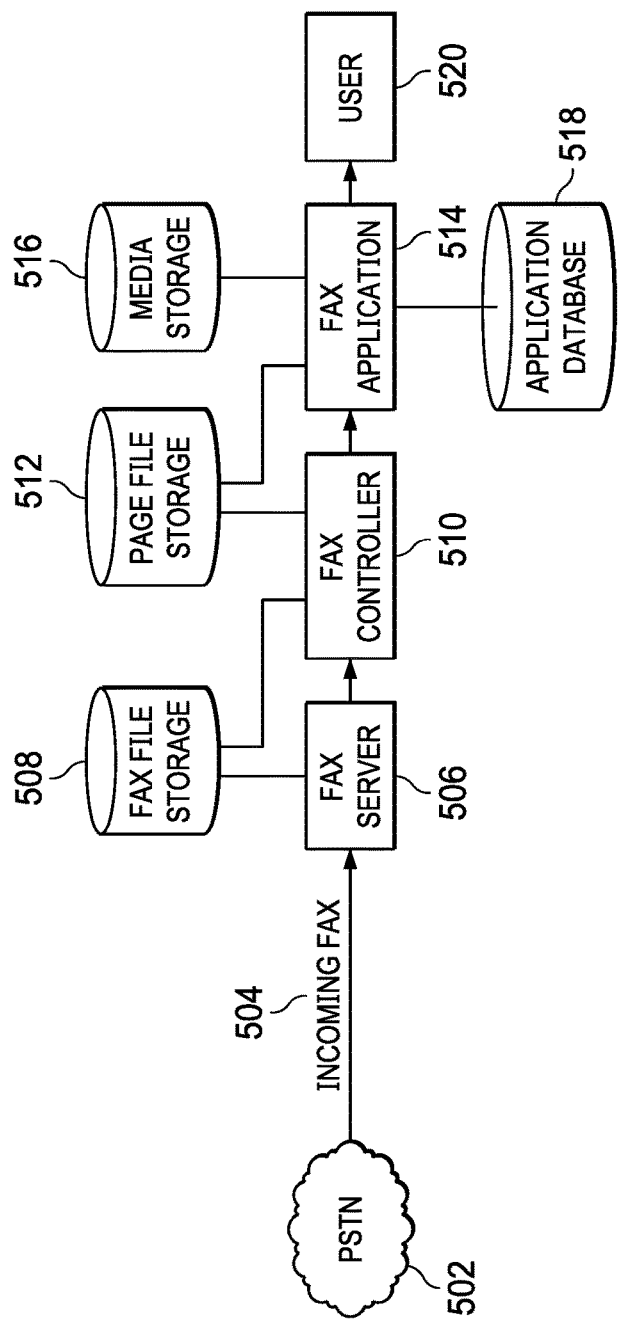
FIG. 5 illustrates a more detailed block diagram of the facsimile delivery system, enabling individual page viewing by a fax recipient.

Referring now to FIG. 5, there is provided a more detailed diagram of the system for delivering facsimile transmissions to a recipient on a page by page basis. The system includes a fax server 506 connected to a telecommunications network 502 that may comprise a cellular telephone network, public switched telephone network or any other type of telecommunications network. The fax application 514 comprises various functions that process and display information with respect to a received facsimile transmission on behalf of a particular user 520. The process is initiated by an incoming fax 504 transmitted to a fax server 506 over a telecommunications network 502.

The fax server 506 may comprise a hardware and/or software implemented component that receives the incoming fax 504 and converts it to a fax file suitable for delivery to the fax controller 510. The fax server 506 operation is controlled by the fax controller 510. The fax controller 510 comprises a software controller that responds to signals from the fax server 506, in order to convert an incoming fax 504 into multiple separate page files, each associated with an individual page of the entire fax document being delivered. The fax file storage 508 is used for storing the incoming fax 504 that is received by the fax server 506. The fax file storage 508 may comprise a database, file, memory, object or server medium or system, or any other suitable storage medium or system. The fax file storage 508 is used for storing the single fax file of the entire fax document that is being received and converted by the fax server 506 with respect to the incoming fax 504.

Figure 6:
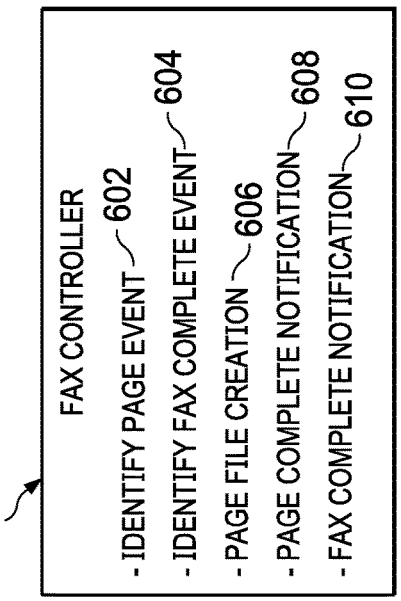
FIG. 6 illustrates the fax controller general functionalities.

The fax controller 510 provides a number of control functionalities for the fax server 506 as more fully illustrated in FIG. 6. The fax controller 510 includes functionality to identify a page event 602. A page event comprises an indication from the fax server 506 that the end of a fax page has been reached. Upon detection of the page event 602, the fax controller 510 accesses the multipage fax file stored by the fax server 506 within the fax file storage 508 and creates a new page file within the page file storage 512. The page file storage 512 may comprise a database, file, memory, object or server medium or system, or any other suitable storage medium or system. After page file creation 606, the fax controller 510 generates and transmits a page complete notification 608 to the fax application 514. The fax controller 510 also includes functionality to identify a fax complete event 604, which identifies the completion of the entire fax transmission by the fax server 506. Upon detection of the fax complete event 604, the fax controller 510 generates and transmits a fax complete notification 610 to the fax application 514.

Figure 7:
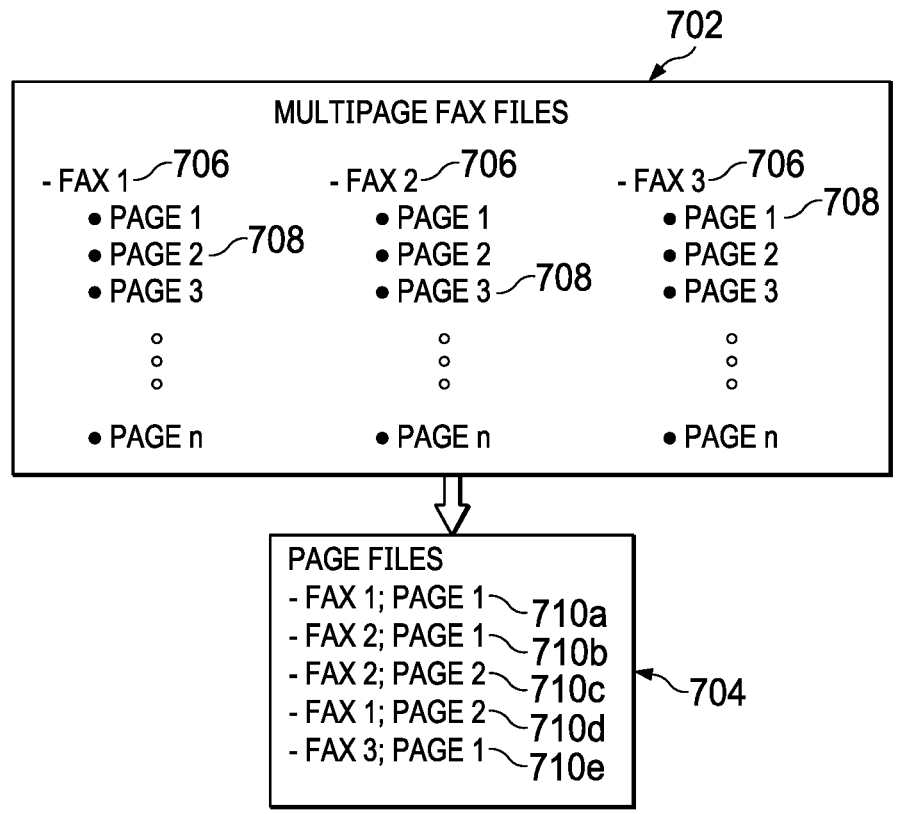
FIG. 7 illustrates fax files as processed by the fax server and page files as processed by the fax controller.

The page file creation 606 functionality enables the creation of a page file on a page by page basis for each page of the fax transmission. The page file creation 606 functionality analyzes the fax file of the entire fax within the fax file storage 508 and creates a page file for each page of the fax transmission therefrom by extracting only that portion of the fax file stored within the fax file storage 508 that is associated with a particular page. The page file is stored within the page file storage 512 for each of the individual pages until they are delivered to the fax application 514. Referring now also to FIG. 7, there is illustrated the fax files 702 as stored within the fax file storage 508 associated with entire fax transmissions and the page files 704 extracted from individual fax files 706 and stored within the page file storage 512. The fax files 702 include a plurality of fax files 706, each associated with a different fax transmission. These are denoted in FIG. 7 as Fax 1, Fax 2 and Fax 3. Each of the fax files 706 have included therein multiple pages 708 going from Page 1 to Page n, which comprises the last page of the fax. The page file creation 606 functionality of the fax controller 510 responds to the page event 602 notification from the fax server 506, in order to access the individual fax file 706 associated with a particular fax and generates a separate page complete notification for each page 708 of the fax, after extracting the portion of the fax file 706 associated with an individual document page. Thus, the page file storage 512 containing the page files 704 will include multiple independent page files 710. Each of the individual page files 710 is associated with a single fax and a single page of the single fax. Thus, page file 710*a* comprises a page file of Fax 1, Page 1; page file 710*b* comprises a page file of Fax 2, Page 1; page file 710*c* comprises a page file of Fax 2, Page 2; etc. Thus, the fax file storage 508 and the page file storage 512 store different representations of the facsimile transmissions, where the fax file storage 508 stores a single fax file of the entire facsimile transmission and the page file storage 512 stores multiple page files, each associated with an individual page of the facsimile transmission as extracted from the associated fax file within the fax file storage 508.

Figure 8:
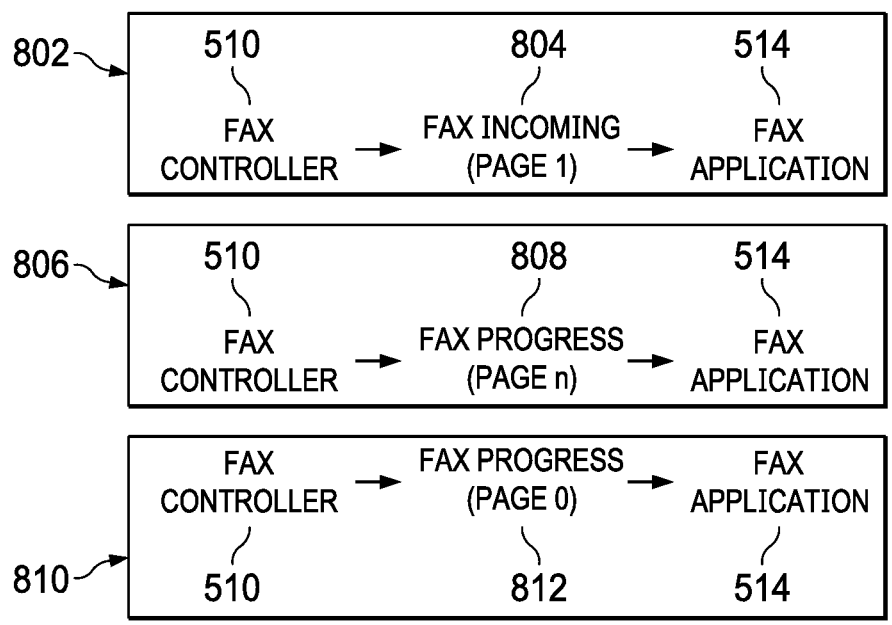
FIG. 8 illustrates the various signaling messages transmitted by the fax controller to the fax application.

Referring now back to FIG. 6, the fax controller 510 additionally includes both page complete notification 608 functionality and fax complete notification 610 functionality. The fax controller 510 sends a page complete notification 608 to the fax application 514, which makes the page available to the user 520. The fax application 514 also notifies the user 520 of the availability of the first page and the ability to access the first page of the fax transmission. In alternative embodiments, the fax application 514 may also notify the user 520 of the receipt of any particular page number or page numbers of the fax transmission and the ability of the user to access each of the fax transmission pages up to the page indicated by the notification provided by the fax application. Referring now more particularly to FIG. 8, there are illustrated various types of notification that may be transmitted from the fax controller 510 to the fax application 514. As shown generally at 802, the fax controller 510 may transmit an initial fax page indication "Fax Incoming (Page 1)" 804 to the fax application 514. The Fax Incoming (Page 1) 804 indication notifies the fax application 514 that the first page of the fax transmission is available to download. The fax controller 510 also may transmit as shown generally at 806 the "Fax Progress (Page n)" 808 indication to the fax application 514 for each page after the first page of the fax transmission. Thus, the Fax Progress (Page n) 808 indication would be sent for each page of the fax transmission from the second page to the last page. Finally, as shown generally at 810, the "Fax Progress (Page 0)" 812 provides an indication that the fax transmission has been completed and that no further pages are available for download.

Referring now back to FIG. 5, the signals generated by the fax server 506 under control of the fax controller 510 are transmitted over a data communications network to the fax application 514. The signals transmitted to the fax application 514 comprise the status messages such as those described hereinabove with respect to FIG. 8 and the individual page files stored within the page file storage 512. Upon receiving a page complete notification, the fax application 514 downloads the appropriate page file from the page file storage 512, stores a copy of the page file within the media storage 516 and renders the page file into a format suitable for viewing by the user 520. The media storage 516 may comprise a database, file, memory, object or server medium or system, or any other suitable storage medium or system. Optionally, the fax application may resize the rendered image to new dimensions, if so requested by the user 520. Resizing is not required. When a page file is stored within the media storage 516, an entry is made in a media record 532 stored within the application database 518. The storage of the rendered/resized image files within the media storage 516 and the creation of media records 532 within the application database 518 are controlled by the fax application 514.

Referring now to FIG. 9, there is more fully illustrated the structure of the media records 532 stored within the application database 518. The fax application 514 creates media records 532 within the application database 518. FIG. 9 illustrates the media records 532 that have been created for a particular facsimile transmission. The media records 532 will consist of multiple documents labeled as Doc 1 through Doc n. Each of the documents Doc 1 through Doc n contains a single Page 1; however, each Page 1 comprises a different page of the transmitted facsimile. Thus, Doc 1/Page 1 is associated with Page 1 of the facsimile transmission, Doc 2/Page 1 is associated with Page 2 of the facsimile transmission, Doc 3/Page 1 is Page 3 of the facsimile transmission and so forth.

Referring now back to FIG. 5, a user 520 to whom faxes have been sent may access the individual pages of the fax document stored within the media storage 516 through the fax application 514. The user 520 communicates with the fax application 514 over a data network such as the Internet. The user 520 requests that access to the currently available pages of the facsimile transmission within the media storage 516 be provided to the user after some type of standard authentication process. The fax application 514 determines the location of the fax by accessing the media records 532 that point to the location of the facsimile document and its associated pages within the media storage 516. The user 520 may view any page of the facsimile transmission that has been downloaded to the media storage 516.

Referring now to FIG. 8, when the fax application 514 receives one of the fax status indications such as Fax Incoming (Page1) 804 indicating the first page of the facsimile transmission or Fax Progress (Page0) 812 indicating the completion of the facsimile transmission, the fax application 514 may send an alert message to the user 520 responsive to these indications. In the case of a Fax Incoming (Page1) 804 indication, the user 520 is provided with an alert message indicating that a first page of a fax transmission is available. In the case of a Fax Progress (Page0) 812 indication, the user 520 is provided with an alert message indicating that transmission of the fax has been completed. The use of the alerts and the ability to access individual fax pages while the entire fax is still being received enables the user 520 to more quickly access the early pages of the fax, which can be of great benefit when business or medical decisions must be made by the user 520 in a relatively quick manner.

Referring now to FIG. 10, there is illustrated a flow diagram describing the operation of the facsimile delivery system with respect to the fax server 506 and fax controller 510 portions of the system. Initially, the fax server 506 answers the incoming fax call at step 1002 and receives each page at step 1004. The fax server 506 stores each fax page in a multipage fax file within the fax file storage 508 at step 1006. For each page stored in the fax file, the fax server 506 sends a page event notification to the fax controller 510 at step 1008. Inquiry step 1010 determines whether the fax transmission is complete. If not complete, control passes to step 1004 where the fax server 506 receives the next page of the facsimile transmission. This process continues until the entire fax has been received. When inquiry step 1010 determines that the facsimile transmission is complete, control passes to step 1012, where the fax server 506 generates and transmits the fax complete signal to the fax controller 510.

Figure 12:
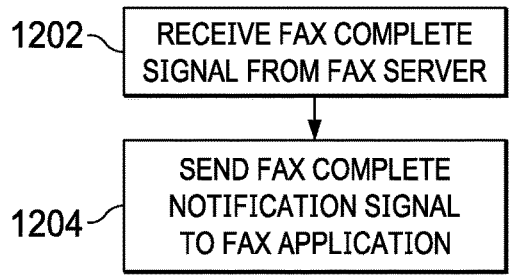
FIG. 12 illustrates a flow diagram of the fax complete processing by the fax controller.

Referring now to FIG. 11, there is illustrated a flow diagram describing the operation of the fax controller 510 portion of the system. For each page in an inbound facsimile transmission, the fax controller 510 receives a page event 602 from the fax server 506 at step 1102. The fax controller 510 accesses the multipage fax file 706 associated with the inbound facsimile transmission, extracts the page associated with the page event at step 1104 and creates a new page file 710 at step 1106. Finally, the fax controller 510 sends a page complete notification to the fax application 514 at step 1108. Referring now also to FIG. 12, there is illustrated a flow diagram describing the operation of the fax controller 510, as it pertains to the fax complete event 604 from the fax server 506. At the end of each facsimile transmission, the fax controller 510 receives a fax complete event 604 from the fax server 506 at step 1202. Upon receiving the fax complete event, the fax controller 510 sends a fax complete notification 610 to the fax application 514 at step 1204.

Figure 13:
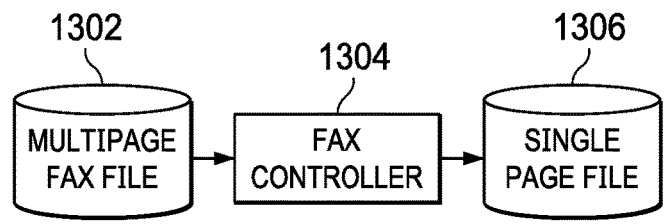
FIG. 13 illustrates a method for extracting a single fax page from a multipage fax file.

Referring now to FIG. 13, there is illustrated the page file creation 606 functionality of the fax controller 510. Upon receiving a page event 602 from the fax server 506, the fax controller 510 accesses the multipage fax file 706 within the fax file storage 508 and extracts one page (the page associated with the page event 602) and creates a new page file 710 within the page file storage 512.

Figure 14:
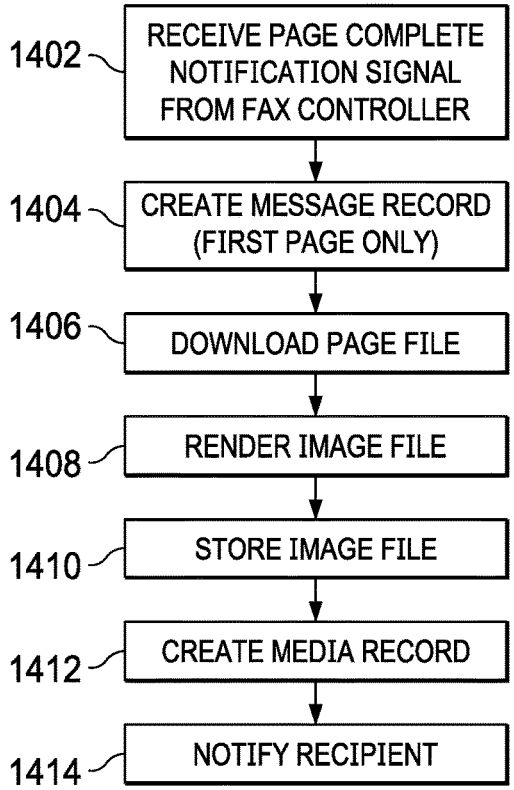
FIG. 14 illustrates a flow diagram of the page complete processing by the fax application.

Referring now to FIG. 14, there is illustrated a flow diagram describing the operation of the fax application 514 portion of the system. The fax application 514 comprises various functionalities needed to receive and to display the pages of a fax stored within the media storage 516 to a user 520. The fax application 514 receives a page complete notification from the fax controller 510 at step 1402, indicating that a first or subsequent page of a fax has been received at the fax server 506. Responsive to the page complete notification, the fax application creates a message record 530 at step 1404 within the application database 518 if the page complete notification is associated with the first page of the fax. This message record 530 represents an entire fax and is associated with all of the pages of the fax. The fax application 514 downloads the page file that is associated with the page complete notification. The fax application 514 downloads the page file from the page file storage 512 at step 1406 and stores it within the media storage 516. The fax application 514 renders the page at step 1408 into a format suitable for display to the user 520 and stores the rendered image file within the media storage 516 at step 1410. The fax application 514 creates a media record 532 at step 1412 for the page of the facsimile transmission that is associated with the page complete notification and stores the media record 532 within the application database 518. If the page complete notification is associated with the first page of the fax, the fax application 514 sends an alert message to the user 520 at step 1414. This alert indicates to the user 520 that a new fax is arriving. In alternative embodiments, the fax application 514 may also notify the user 520 of the receipt of any particular page number or page numbers of the fax transmission and the ability of the user to access each of the fax transmission pages up to the page indicated by the notification provided by the fax application.

Figure 15:
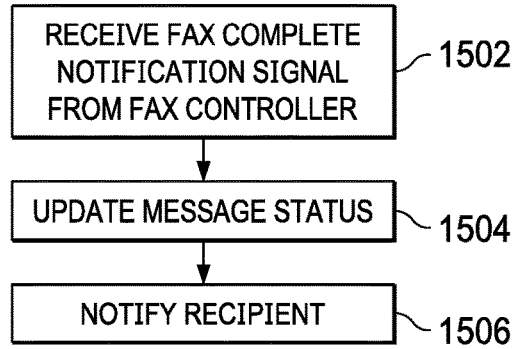
FIG. 15 illustrates a flow diagram of the fax complete processing by the fax application.

Referring now to FIG. 15, there is illustrated a flow diagram describing the operation of the fax application 514 portion of the system, as it pertains to the fax complete notification. The fax application 514 receives a fax complete notification from the fax controller 510 at step 1502, indicating that a facsimile transmission at the fax server 506 has completed. Responsive to the fax complete notification, the fax application 514 updates the message status in the message record 530 within the application database 518 at step 1504. Finally, the fax application 514 sends an alert message to the user 520 at step 1506, indicating that the facsimile transmission is complete.

Figure 16:
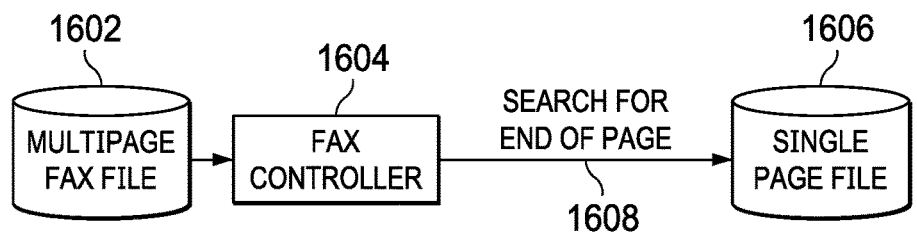
FIG. 16 illustrates an alternate method for extracting an individual page from a multipage fax file into a page file.

Referring now to FIG. 16, there is illustrated an alternative embodiment wherein the fax controller 510 creates the individual page files that are stored within the page file storage 512 responsive to a determination of an end of fax page by analyzing the contents of the fax file within the fax file storage 508 rather than responsive to the page event indication provided by the fax server 506. In this case, the fax controller 510 goes through a process 1608 that searches for the end of page indicator within the fax file 1602 stored within the fax file storage 508, extracts the page and saves it to the page file 1606 within the page file storage 512. The end of page indication may be identified in any number of fashions within the fax file including a particular indication at the end of each fax page or an indication at the beginning of a subsequent fax page. Therefore, rather than extracting a single page file from the fax file stored within the fax file storage 508 upon receipt of a page event indication from the fax server 506, the fax controller 510 searches the coding within the fax file for this type of indication, independently determines when a page has ended and initiates the extraction and storage of the page file associated with the fax file stored within the fax file storage 508, before each page file is downloaded by the fax application 514. It will be appreciated by one skilled in the art that a variety of other techniques may be utilized for detecting the ends of pages within a fax file that provide the actuation of creation of the individual page files.

Utilizing the above system and method, a fax recipient will have a much earlier opportunity to view the initial pages of a fax transmission. The fax recipient will be able to review each page of the fax document as soon as it is received rather than waiting until the entire document has been delivered. In situations where a fax is being transmitted to multiple competing fax recipients and a decision must be made by each fax recipient and a response must be returned to the fax sender within a relatively short period of time, the fax recipient has the ability to view the relevant information within a transmitted fax at the earliest opportunity and quickly respond, which provides a great benefit over other fax recipients who must wait until the entire fax has been received.

It will be appreciated by those skilled in the art having the benefit of this disclosure that this system and method for delivering faxes to a recipient on a page by page basis allows fax recipients to more quickly view initial pages of a fax without waiting for receipt of the entire fax. It should be understood that the drawings and detailed descriptions herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for delivering a fax to a fax recipient, comprising:
receiving a multipage fax file at a fax server;
storing the multipage fax file;
generating a page event notification for each fax page received of the multipage fax file at the fax server while the multipage fax file is being received;
accessing each page of the multipage fax file responsive to generation of the page event notification;
generating a corresponding page file during receipt of a page of the multipage fax file for each page of the multipage fax file that is accessible apart from the multipage fax file responsive to the page event notification while the multipage fax file is being received;
storing the generated corresponding page file for each page of the multipage fax file while the multipage fax file is being received;
generating a page complete notification upon completion of generation of each page of the multipage fax file into the corresponding page file; and
enabling access to the corresponding page file associated with the multipage fax file by the fax recipient responsive to receipt of the page complete notification associated with the corresponding page file, wherein access to the corresponding page file is enabled while subsequent pages of the multipage fax file are being received at the fax server.

2. The method of claim 1, wherein the step of generating the corresponding page file further comprises:
extracting portions of the multipage fax file associated with individual pages of a multipage fax transmission from the multipage fax file associated with the multipage fax transmission at a first storage location; and
storing the extracted portions as the corresponding page files associated with the individual pages of the multipage fax transmission at the first storage location in a second storage location.

3. The method of claim 1, wherein the step of enabling access further comprises:
receiving the page complete notification at a fax application, the fax application comprising at least one fax application server;
creating a message record that represents the fax associated with the multipage fax file;
downloading the corresponding page file associated with the page complete notification, using the at least one fax application server;
rendering the corresponding page file into an image file for display, using the at least one fax application server;
storing the image file at a third storage location associated with at least one fax application server; and
generating a media record at a fourth storage location indicating a storage location of the image file.

4. The method of claim 3 further comprising resizing of the image file to a predetermined image size, using the at least one fax application server.

5. The method of claim 3 further comprising generating an alert message to the fax recipient after storage of the image file and generation of the media record associated with the image file, the alert message indicating that an associated page of the multipage fax file is ready to access.

6. The method of claim 3 further comprising providing access to the image file at the third storage location through the at least one fax application server.

7. A method for delivering a fax to a fax recipient, comprising:
receiving a multipage fax file transmitted to a fax server;
storing the multipage fax file associated with an entire multipage fax transmission at a first storage location;
generating a page event notification for each fax page received of the multipage fax file;
extracting page files associated with individual pages of the entire multipage fax transmission from the multipage fax file associated with the entire multipage fax transmission at the first storage location;
storing the extracted page files associated with the individual pages of the multipage fax transmission at the first storage location in a second storage location;
generating a page complete notification upon completion of conversion of each page of the multipage fax file into a page file;
receiving the page complete notification at a fax application, the fax application comprising at least one fax application server;
creating a message record representing the fax associated with the multipage fax transmission;
downloading the page file associated with the page complete notification from the second storage location, using the at least one fax application server;
rendering the page file into an image file for display, using the at least one fax application server;
storing the image file at a third storage location associated with at least one fax application server;
generating a media record at a fourth storage location indicating a storage location of the image file; and
enabling access to the image file associated with each page of the multipage fax file, using the at least one fax application server, wherein access to the image file is enabled while subsequent pages of the multipage fax file are being received.

8. The method of claim 7 further comprising generating a fax complete notification upon completion of conversion of all pages of the multipage fax file.

9. The method of claim 7 further comprising resizing the image file to at least one predetermined image size, using the at least one fax application server.

10. The method of claim 7 further comprising generating an alert message to the fax recipient after storage of the image file and generation of the media record associated with the image file, the alert message indicating that an associated page of the multipage fax file is ready to access.

11. A system for delivering a fax to a fax recipient, comprising:
a fax server for receiving a multipage fax file associated with an entire multipage fax transmission to be delivered and for storing the multipage fax file associated with the entire multipage fax transmission and for generating a page event notification for each fax page received of the multipage fax file at the fax server while the multipage fax tranmission is being received;
a fax controller associated with the fax server, wherein the fax controller:
accesses each page of the multipage fax file responsive to the page event notification while the multipage fax file is being received;
generates a corresponding page file during receipt of a page of the multipage fax transmission for each page of the multipage fax file that is accessible apart from the multipage fax file responsive to the page event notification while the multipage fax file is being received;
stores the generated corresponding page file for each page of the multipage fax file while the multipage fax transmission is being received;

generates a page complete notification upon completion of generation of each page of the multipage fax file into the corresponding page file; and a fax application associated with the fax controller enabling access to the corresponding page file associated with the multipage fax file by the fax recipient responsive to receipt of the page complete notification associated with the corresponding page file, wherein access to the corresponding page file is enabled while subsequent pages of the multipage fax file are being received.

12. The system of claim 11, wherein the fax controller provides functionality to:

extract portions of the multipage fax file associated with individual pages of the multipage fax transmission from the multipage fax file associated with the entire multipage fax transmission at a first storage location; and store the extracted portions as the corresponding page files associated with the individual pages of the multipage fax transmission in a second storage location.

13. The system of claim 11, wherein the fax controller further controls operation of the fax server to generate a fax complete notification upon completion of the multipage fax transmission.

14. The system of claim 11, further comprising:
a fax application for:
receiving the page complete notification; and downloading the corresponding page file associated with the page complete notification; and
rendering the corresponding page file into an image file for display;
wherein the fax application further stores the image file at a third storage location associated with at least one fax application server; and
wherein the fax application further generates a media record at a fourth storage location indicating a storage location of the image file.

15. The system of claim 14, wherein the fax application resizes the image file to at least one predetermined image size.

16. The system of claim 14, wherein the fax application generates an alert message to the fax recipient after storage of the image file and generation of the media record associated with the image file, the alert message indicating that an associated page of the multipage fax file is ready to access.

17. The system of claim 16, wherein the fax application may further be implemented within at least one server.

18. The system of claim 14, wherein the fax application provides access to the image file at the third storage location.

* * * * *